Figure 1:
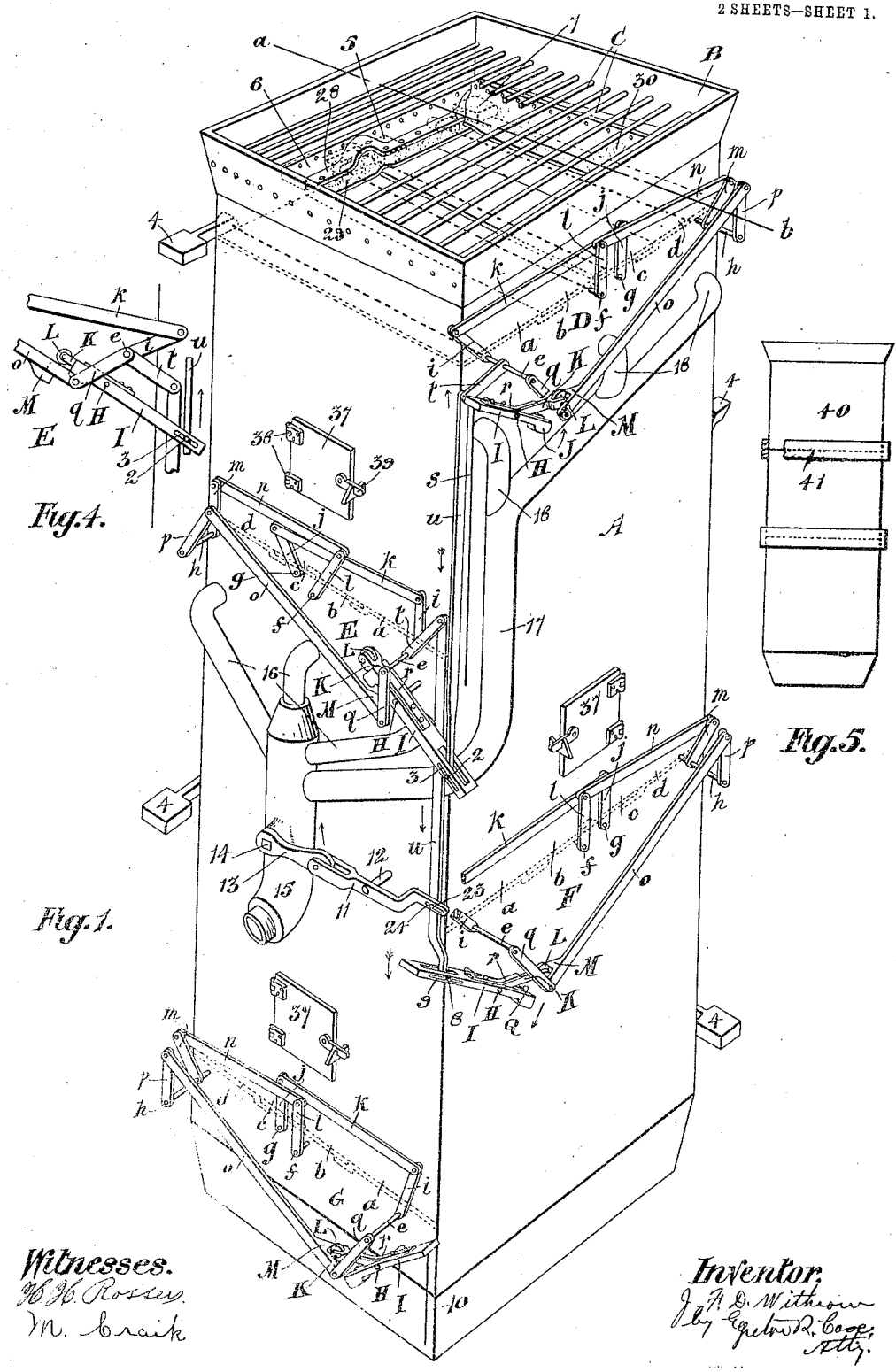

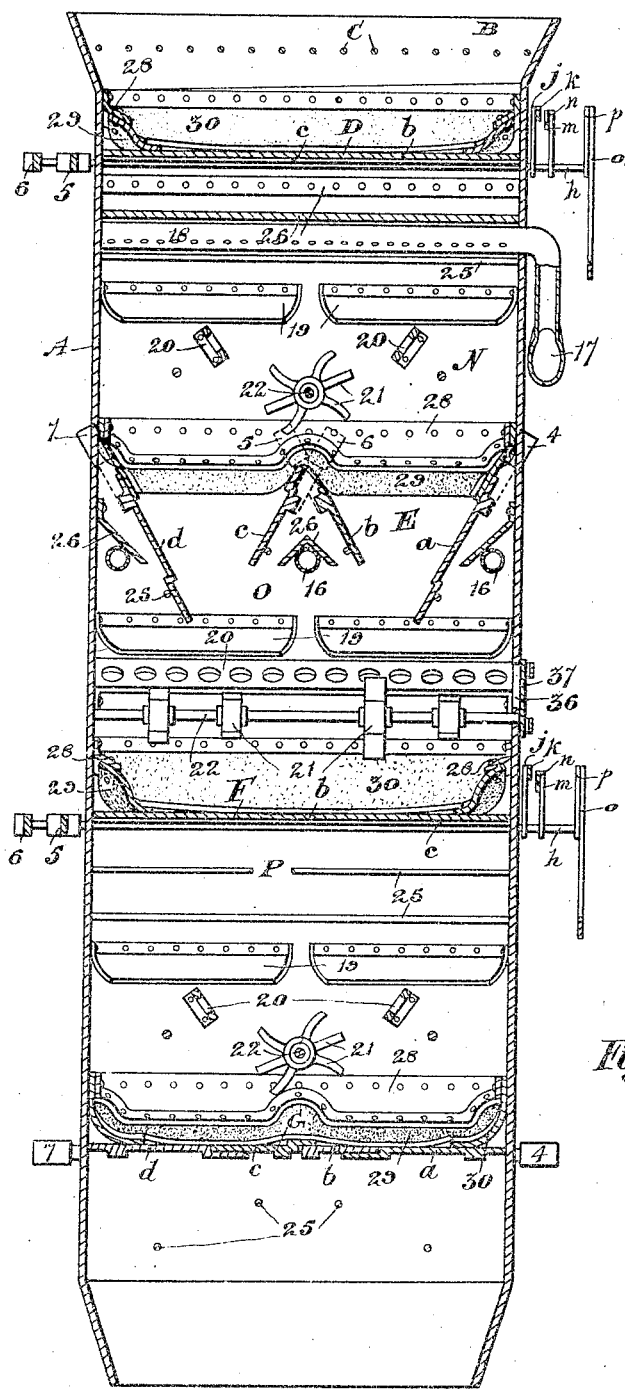
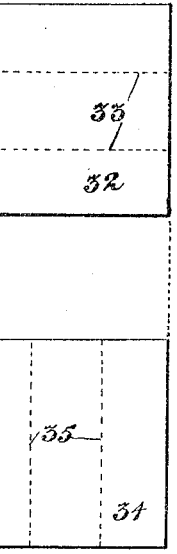
Fig. 2.
Fig. 3.

UNITED STATES PATENT OFFICE.

JOHN FREDERICK DOUGLAS WITHROW, OF OTTAWA, ONTARIO, CANADA.

APPARATUS FOR MIXING CONCRETE.

No. 884,698.

Specification of Letters Patent.

Patented April 14, 1908.

Application filed August 3, 1905. Serial No. 272,494.

*To all whom it may concern:*

Be it known that I, JOHN FREDERICK DOUGLAS WITHROW, a subject of the King of Great Britain, residing in the city of Ottawa, in the county of Carlton, in the Province of Ontario, Canada, civil engineer, have invented certain new and useful Improvements in Apparatus for Mixing Composite Material, of which the following is a specification.

My invention relates to improvements in apparatus for mixing composite material, and the objects of my invention are: firstly, to mix composite materials, such as concrete, in batches by gravity; secondly, to first mix the ingredients composing the composite materials in a dry state and then further mix them in a wet state; thirdly, to prevent as much as possible the ingredients forming the composite material from lodging and interfering with the operation of the apparatus, and fourthly, to provide a cheap and cheaply operated yet efficient apparatus for the purpose before specified, and the apparatus consists broadly of a receptacle, at different heights in which are held traps, and means whereby when the first trap opens the second trap is locked, and when the first trap closes, said second trap is unlocked, and means for automatically introducing water into the mass of material as same is being mixed.

My preferred form of invention consists of a receptacle, at different heights in which are grouped a set of traps the alternate leaves of which are coupled together, and means connecting the uppermost set of traps with the next set below (the alternate leaves of which are also coupled together), whereby when said first set of traps dump, said second set of traps are locked, and when said first set of traps return to normal, said second set of traps are unlocked, and means for automatically introducing water into the mass and turning same off. The line of opening of the different sets of traps varies, that is to say, the second set of traps, for instance, will have a line of opening at right-angles (or at any other suitable angle) to the line of opening of the set of traps immediately above and immediately below, thus causing the mass of composite material to be divided in different directions when dumping therefrom. The placing of the set of traps as before described of course provides a number of chambers within the receptacle, and in order to more thoroughly agitate the mass when passing through these different chambers, I place therein different devices that will perform this function.

Figure 1 is a general perspective view of my apparatus for mixing composite material. Fig. 2 is a vertical central section on the line *a—b*, Fig. 1. Fig. 3 is a diagrammatic view hereinafter referred to. Fig. 4 is a detail hereinafter referred to, and Fig. 5 is a side elevation on a reduced scale (certain parts being omitted) of an alternative form of my receptacle, showing same made of a plurality of superimposed sections.

In the drawings like characters of reference indicate corresponding parts in each figure.

The best way to mix composite materials, such as concrete, is by gravity. By utilizing this law of nature I am enabled to provide an apparatus automatic in its operation, and one in which the composite material is alternately gently and violently mixed in batches. Composite material mixed merely by stirring is not as good at that which has been violently mixed or agitated.

In using my apparatus the ingredients may be shoveled into the hopper in any order. Also in some of the apparatus now on the market, the ingredients composing the composite material fall too far and have sufficient time to become more or less separated, causing a mixture in which sand may predominate in one place; stone and gravel in another place, and a great part of the cement in still another place, thus producing a mixture that is not uniformly of the same strength. By dividing the mass of material in different directions and violently agitating it on its way through the different chambers, I produce a product having uniform strength throughout. By first dry-mixing the ingredients by gravity I intimately commingle same before water is introduced into the mass, thus in the further mixing still further commingling the different elements at the same time I uniformly distribute the water through the mass.

Although I show and describe a set of traps grouped and working together at different heights, it is within the scope of my invention to have only one trap at these different heights and connected together after the manner of my invention. But I prefer to use the set of traps at the different heights, because I am enabled to divide the mass in different places.

My preferred form of invention consists of any suitable receptacle A provided preferably with an hopper-shaped mouth B in which may be held any suitable means for screening the materials passed therethrough in order to prevent the passage into said receptacle of large stones or gravel that might interfere with the working of the apparatus. The means shown for this purpose consist of a plurality of parallel bars C secured at their ends in two opposed sides of said hopper-shaped mouth. The different sets of traps grouped together are constructed the same and controlled in their operation by means or mechanism of the same construction, so in order to give a clear idea of the operation and construction of my apparatus without unnecessary recapitulation, I will separately group the different sets of traps under a distinctive character of reference, and make the same character of reference for the levers and weights common throughout the apparatus.

According to the construction shown, there are four groups or sets of traps D, E, F and G. The traps consist of a plurality of leaves $a$, $b$, $c$ and $d$ mounted in two opposed walls of the receptacle A in any suitable manner. According to the construction shown, I provide spindles $e$, $f$, $g$ and $h$ for same respectively, each having bearing in the same receptacle A. By means of the levers $i$ and $j$ secured to or forming part of their spindles and the link-rod $k$ connecting the upper end of said levers, the leaves $a$ and $c$ are coupled together, and by means of the levers $l$ and $m$ secured to or forming part of their spindles and the link-rod $n$ connecting the upper end of said levers, the leaves $b$ and $d$ are coupled together. The set of traps D are normally locked as shown in Fig. 1, so that the requisite amount of material may be dumped thereupon. As soon as sufficient material has been dumped upon these set of traps, same are unlocked by any suitable means. The locking and unlocking-means for the other sets of traps are similar to that I will now describe.

According to the construction shown I pivot on the spindle H in the sides of the receptacle A adjacent the levers controlling the operation of the different sets of traps, an arm I provided with an outer-weighted end J. Pivoted to the arm I and on the spindle H is a locking-arm K in the outer end of which I preferably mount a roller L which abuts against a stop M secured to or forming part of the link-rod $o$ which connects the levers $p$ and $q$ secured to or forming part respectively of the spindles $h$ and $e$. $r$ is a stiff spring secured to the arm I and having its free end resting against the locking-arm K so as to give positive movement to same. By means of a cord or rod $s$ secured to the arm I this arm is thrown around in the direction indicated by arrow, thus disengaging the locking-arm K from the stop M permitting the link-rod $o$ and all its connected parts to assume the position of the levers and link-rods shown in connection with the set of traps E, thus opening the leaves $a$, $b$, $c$ and $d$ and permitting the material to drop down through the dry-mixing chamber N where they come in contact with different devices hereinafter described for intimately commingling them.

I have shown the set of traps E and their controlling mechanism in their dumping position. The normal position of these set of traps and their connected parts is the shown position of the traps and connected parts in any of the sets of traps D, F and G. Immediately the set of traps D begin to dump, the lever $t$ secured to or forming part of the spindle $e$ of said sets of traps moves in the direction indicated by arrow, thus moving the arm I of the set of traps E (to which arm it is connected by the link-rod $u$ provided with a pin 2 operating in a slot 3 in said arm) around its spindle, moving its roller L (see Fig. 4) down in contact with its stop N, thus effectually locking the set of traps E. From this it will be understood that the set of levers in connection with the set of traps E are normally unlocked. Immediately all the material has fallen upon the set of traps E, the counter-balancing weights 4, 5, 6 and 7 secured respectively on the outside of the opposite end of the spindles $e$, $f$, $g$ and $h$ return the set of traps D and their associated levers and link-rod back to normal position in which position they are locked. The returning to normal position of the set of traps D and their connected parts moves the link-rod $u$ downward in the direction indicated by arrow with tail, thus bringing the arm I of the set of traps E in contact with its locking-arm K and moving its roller L out of contact with the stop M, thus unlocking the link-rod $o$ and levers $p$ and $q$ of the set of traps E and the levers $m$, $l$, $j$ and $i$ and their respective link-rods $n$ and $k$, of the set of traps E permitting the coupled leaves $a$, $c$, $b$ and $d$ of the set of traps E, to assume the position shown in full lines in Fig. 2, thus permitting the material to drop from the leaves in the set of traps E down onto the set of traps F. This movement of the parts connected with the set of traps E of course moves the lever $t$ and link-rod $u$ of said set of traps upward, and as said link-rod $u$ of said set of traps E is connected to the arm I of the set of traps F by the pin 8 operating in the slot 9 in said arm, said arm is moved around in the direction indicated by arrow without tail, thus bringing its locking-arm K and its roller L in contact with the stop M of the link-rod $o$ of the set of traps F locking the set of traps and their connected levers in place before the material falls upon said set of traps. By means of the counter-weights 4, 5, 6 and 7 of the set of traps E the said set of traps and their connected parts are returned to normal position. The returning to normal position of the set of traps E and their connected parts, moves the lever t and link-rod u of said set of traps E downward, thus throwing the arm I of the set of traps F around in the direction indicated by arrow with tail, thus unlocking the levers and link-rods controlling said set of traps F and permitting them to dump the material down onto the set of traps G. Immediately the set of traps F have dumped, their counter-weights return them to normal position. In order to dump the material from the set of traps G the arm I of said set of traps is operated by the rod or core 10 so as to unlock the levers and link-rods of said set of traps G and permit the materials, now thoroughly mixed, to drop from the receptacle A.

As the materials drop through the dry-mixing chamber N, (which is that part of the receptacle between the set of traps D and the set of traps E), they are intimately commingled in a dry state. When the set of traps E begin to open, I provide means whereby water is introduced upon and into the body of material controlled by said set of traps E. As the link-rod u of the set of traps E moves into the position shown in Fig. 1, it moves the lever 11 around its stud 12 (whereby it is pivoted to the said receptacle) thus moving the arm 13 (controlling any suitable valve 14, controlling the passage of water through the water-main 15) so as to turn on a supply of water which passes through the branch-pipes 16 into the body of the mass, another stream of water passing through the branch-pipe 17 and out of the branch-pipes 18 and falling upon the top of the mass. The material is now wet and it passes through the first wet-mixing chamber O which is between the set of traps E and the set of traps F. After the set of traps F have dumped, the mass of material passes through a second wet-mixing chamber P which is between the set of traps F and the set of traps G.

It will be understood that as the link-rod u and lever t of the set of traps E are returning to normal, the supply of water is cut off through the means before described.

In each of the chambers N, O and P are placed devices against which the material falls or strikes or through which it passes in order to insure the positive commingling of the ingredients. These devices may be of any suitable construction. 19 are plates suitably secured to the inner walls of the receptacle, and are curved in different directions so as to cause the materials to be deflected in their path and mixed. 20 are perforated plates extending across the receptacle, which further cause the mixture of the different ingredients. 21 are suitable vanes loosely mounted on rods 22 held in the sides of the receptacle. The material falling upon these vanes causes them to rotate, thus batting the material. As these vanes are loosely mounted they will revolve in different directions, thus causing a churning movement to more thoroughly commingle the ingredients. By means of the pin 23 operating in the slot 24, the rod u of the set of traps E controls the movement of the lever 11.

25 are rest-rods against which the leaves of the different sets of traps rest when open to the limit.

26 are guard-plates secured to or forming part of the receptacle A and extending over the water-pipes 16 so as to prevent same from becoming choked by the material.

In order to prevent the materials from lodging at the sides of the leaves of the traps, I provide suitable guard-plates 28. These guard-plates also act as deflectors for the materials and as they must be situated a certain distance above the leaves of the sets of traps in order to permit movement of same, I must provide same with pieces of suitable material 29 such as rubber or canvas: this material is flexible and rests upon the said leaves. In order to prevent the materials from lodging at the ends of the leaves of the sets of traps, I provide suitable material 30 such as canvas or rubber which rests upon said traps: as this material is flexible, it will of course be understood that it does not interfere with the movement of the leaves of the traps.

As before mentioned, I place the different sets of traps so that in its passage through the apparatus, the body of the mass will be divided in different directions. Referring to Fig. 3, 32 represents a diagrammatic view of the mass of material resting upon the set of traps D and the dotted lines 33 indicate the lines of division of the mass when falling from these set of traps.

34 represents a diagrammatic view of the mass of material resting upon the set of traps E and the dotted lines 35 indicate the lines of division of the mass when falling from these sets of traps. From this description the manner in which the mass of material is divided in passing from the other traps, will be clearly understood. Although I show the lines of division for the set of traps E as being at right-angles to the lines of division for the set of traps D, it will of course be understood that I do not confine myself to any particular lines of division for the respective sets of traps. But I find I get the best possible results in dividing the mass of material in directions as much opposed to each other as possible. By dividing the mass of material in accordance with my invention and commingling the ingredients by any suitable means as it passes through the different chambers, it will be clearly understood that I get a thorough mixture and am enabled to produce composite material having uniform strength throughout.

It will be understood that the leaves of my traps open to a certain angle: They of course may be constructed so that their range of movement will be such as to throw them parallel with the walls of the receptacle, but when the leaves are so opened, the mass of material merely drops down between same. By opening these leaves a certain distance it will be noticed upon referring to Fig. 2 that the leaves *a* and *b* form between them a hopper, the discharge-opening of which is narrower than the top, and that the leaves *c* and *d* form another hopper, the discharge-opening of which is also narrower than the top. By opening the leaves in all the sets of traps a certain angle, it will be understood that I provide a series of hoppers so that as the divided mass passes through its respective hopper, the materials are thrown close together during their exit therefrom, thus causing them to further commingle. This movement given the materials as they pass from the hoppers formed by the leaves is gentler than that given to them as they pass around and through the mixing-devices contained in the chamber they drop into. From the before-going description it will be understood that I combine violent mixing of the materials with gentler mixing of same.

In order to permit of the inspection of the different chambers, I provide openings 36 in the sides of the receptacle which are closed by doors or covers 37. According to the construction shown, I show these closing-members as being doors and they are secured by their hinges 38 to the receptacle A and locked in position by any suitable catch-and-latch 39.

If desired, the receptacle A may be made up of a series of superimposed sections 40, as shown in Fig. 5. In order that the sections may fit one upon another, suitable means may be provided for this purpose. According to the construction shown, I provide flanges 41 secured to or forming part of either of the body-sections and by means of which they are held in alinement. Although I show the lower opening of the receptacle A as converging, this of course is immaterial.

As before mentioned, the levers and link-rods in connection with the set of traps E and the set of traps F, are normally unlocked referring to the detail view in Fig. 4 will be seen the normal position of the parts before described immediately in the neighborhood of the locking and unlocking-arm I. The roller L of this arm normally rests above the stop M so that it has merely to be moved downward in order to abut said stop and lock the different levers. The arm I is constructed with a bed-way Q which receives the locking arm K.

From the description and drawings of my apparatus, it will be understood that two leaves of each set of traps are coupled together, and have preferably simultaneous movement with the other coupled members coöperating therewith. By constructing certain leaves, for instance the leaves *a* and *d* wider than the leaves coöperating therewith, I provide the hoppers formed by the leaves *a* and *b*, and *c* and *d* with a longer lip over which the material is compelled to pass or flow, thus causing an action at this point that will insure to the thorough commingling of the ingredients.

What I claim as my invention is:

1. An apparatus of the class described, comprising a rigid non-moving supporting structure, a first trap therein; a second trap therebelow, said traps being a fixed distance apart; a non-moving receptacle above each trap; means normally holding said traps closed; means controlled by the opening of said first trap adapted to lock said second trap in its normal closed position.

2. An apparatus of the class described, comprising a rigid non-moving supporting structure; a first trap therein; a second trap therebelow, said traps being a fixed distance apart; a non-moving receptacle above each trap; means normally holding said traps closed; means controlled by the opening of said first trap adapted to lock said second trap in its normal closed position, and means controlled by said second trap whereby water is introduced into the material undergoing mixing.

3. An apparatus of the class described, comprising a suitable receptacle; a first trap therein adapted to control passage of material therethrough; a second trap therein and below said first trap also adapted to control passage of material therethrough; means adapted to lock said second trap in its closed position and to unlock same when said first trap opens and closes; means counterbalancing said traps adapted to return same to normal position after dumping; means, controlled by said second trap, adapted to introduce a fluid into said receptacle.

4. An apparatus of the class described, comprising a rigid non-moving supporting structure; a first trap therein; a second trap therebelow; said traps being a fixed distance apart and opening crosswise one to the other; a non-moving receptacle above each trap; means normally holding said traps closed; means controlled by the opening of said first trap adapted to lock said second trap in its normal closed position, and means controlled by said second trap whereby water is introduced into the material undergoing mixing.

5. An apparatus of the class described, comprising in combination a suitable receptacle; a first trap; a second trap below said first trap and opening crosswise thereto;

means adapted to lock and unlock said second trap in its closed position, said means being controlled by the operation of said first trap; means adapted to supply fluid to said receptacle, said fluid supply being started and cut off by said second trap.

6. An apparatus of the class described, comprising a suitable receptacle; a first trap therein adapted to control passage of material therethrough; a second trap below said first trap and opening crosswise thereto and adapted to control passage of material therethrough; means adapted to lock said second trap in its closed position and to unlock same when said first trap opens and closes; means counterbalancing said traps adapted to return same to normal position after dumping; means, controlled by said second trap, adapted to introduce a fluid into said receptacle.

7. An apparatus of the class described, comprising a suitable receptacle; a first trap therein adapted to control passage of material therethrough; a second trap therein also adapted to control passage of material through said receptacle and below said first trap and having an angle of opening different to the angle of opening of said first trap; means connecting said traps adapted when said first trap opens, to lock said second trap in its closed position, and when said first trap returns to normal position, to unlock said second trap, and means held in said receptacle between said traps adapted to mix and baffle the material.

8. An apparatus of the class described, comprising a suitable receptacle; a first set of traps comprising a plurality of leaves swung therein and controlling passage of material therethrough; means for coupling said leaves together in pairs; means connected with the coupling-means for said leaves whereby same are locked in position at certain periods; a second set of traps below said first set of traps, comprising a plurality of leaves swung in said receptacle and controlling passage of material therethrough; means for coupling said leaves together in pairs; means connected with the coupling-means for said leaves whereby same are locked in position at certain periods, and means whereby when said first set of traps are unlocked, the locking-means for said second set of traps are operated to lock same, and when said first set of traps return to normal position the locking-means for said second set of traps is operated to unlock same.

9. An apparatus of the class described, comprising a suitable receptacle; a first set of traps comprising a plurality of leaves swung therein and controlling passage of material therethrough; means for coupling said leaves together in pairs; means connected with the coupling-means for said leaves whereby same are locked in position at certain periods; a second set of traps below said first set of traps, comprising a plurality of leaves swung in said receptacle and controlling passage of material therethrough; means for coupling said leaves together in pairs; means connected with the coupling-means for said leaves whereby same are locked in position at certain periods; means whereby when said first set of traps are unlocked, the locking-means for said second set of traps are operated to lock same, and when said first set of traps return to normal position the locking-means for said second set of traps is operated to unlock same, and means controlled by said second set of traps whereby when same open, water is introduced into the receptacle and when said second set of traps close, the supply of water is cut off.

10. An apparatus of the class described, comprising a suitable receptacle; a first set of traps comprising a plurality of leaves swung therein and controlling passage of material therethrough; means for coupling said leaves together in pairs; means connected with the coupling-means for said leaves whereby same are locked in position at certain periods; a second set of traps below said first set of traps comprising a plurality of leaves swung in said receptacle and controlling passage of material therethrough; means for coupling said leaves together in pairs; means connected with the coupling-means for said leaves whereby same are locked in position at certain periods; means whereby when said first set of traps are unlocked, the locking-means for said second set of traps are operated to lock same, and when said first set of traps return to normal position the locking-means for said second set of traps are operated to unlock same; means controlled by said second set of traps whereby when same open, water is introduced into the receptacle, and when said second set of traps close, the supply of water is cut off, and counter-balancing means whereby the leaves of said sets of traps are returned to normal position after dumping.

11. An apparatus of the class described, comprising a suitable receptacle; a first set of traps comprising a plurality of leaves swung therein and controlling passage of material therethrough; means for coupling said leaves together in pairs; means connected with the coupling-means for said leaves whereby same are locked in position at certain periods; a second set of traps below said first set of traps comprising a plurality of leaves swung in said receptacle and controlling passage of material therethrough; means for coupling said leaves together in pairs whereby same are locked in position at certain periods; means whereby when said first set of traps are unlocked, the locking-means for said second set of traps are operated to lock same, and when said first set of traps return to normal position the locking-means for said second set of traps are operated to lock same, and when said first set of traps return to normal position the locking-means for said second set of traps are operated to unlock same; means controlled by said second set of traps whereby when same open, water is introduced into the receptacle, and when said second set of traps close, the supply of water is cut off; counter-balancing means whereby the leaves of said sets of traps are returned to normal position after dumping, and means held in said receptacle between said sets of traps whereby the material is mixed.

12. An apparatus of the class described, comprising a suitable receptacle; a first set of traps comprising a plurality of leaves swung therein and controlling passage of material therethrough; means for coupling said leaves alternately together in pairs; means connected with the coupling-means for said leaves whereby same are locked in position at certain periods; a second set of traps below said first set of traps comprising a plurality of leaves swung in said receptacle and having an angle of opening different to the angle of opening of the leaves in said first set of traps and controlling passage of material therethrough; means for coupling said leaves alternately together in pairs; means connected with the coupling-means for said leaves whereby same are locked in position at certain periods, and means whereby when said first set of traps are unlocked, the locking-means for said second set of traps are operated to lock same, and when said first set of traps return to normal position, the locking-means for said second set of traps is operated to unlock same.

13. An apparatus of the class described, comprising a suitable receptacle; a first set of traps comprising a plurality of leaves swung therein and controlling passage of material therethrough; means for coupling said leaves alternately together in pairs; means connected with the coupling-means for said leaves whereby same are locked in position at certain periods; a second set of traps below said first set of traps comprising a plurality of leaves swung in said receptacle and having an angle of opening different to the angle of opening of the leaves in said first set of traps and controlling passage of material therethrough; means for coupling said leaves alternately together in pairs; means connected with the coupling-means for said leaves whereby same are locked in position at certain periods; means whereby when said first set of traps are unlocked, the locking-means for said second set of traps are operated to lock same, and when said first set of traps return to normal position, the locking-means for said second set of traps are operated to unlock same, and means controlled by said second set of traps whereby when same open, water is introduced into the receptacle and when said second set of traps close, the supply of water is cut off.

14. An apparatus of the class described, comprising a suitable receptacle; a first set of traps comprising a plurality of leaves swung therein and controlling passage of material therethrough; means for coupling said leaves alternately together in pairs; means connected with the coupling-means for said leaves whereby same are locked in position at certain periods; a second set of traps below said first set of traps comprising a plurality of leaves swung in said receptacle and having an angle of opening different to the angle of opening of the leaves in said first set of traps and controlling passage of material therethrough; means for coupling said leaves alternately together in pairs; means connected with the coupling-means for said leaves whereby same are locked in position at certain periods; means whereby when said first set of traps are unlocked, the locking-means for said second set of traps are operated to lock same, and when said first set of traps return to normal position, the locking-means for said second set of traps are operated to unlock same; means controlled by said second set of traps whereby when same open, water is introduced into the receptacle, and when said second set of traps close, the supply of water is cut off, and counter-balancing means whereby the leaves of said sets of traps are returned to normal position after dumping.

15. An apparatus of the class described, comprising a suitable receptacle; a first set of traps comprising a plurality of leaves swung therein and controlling passage of material therethrough; means for coupling said leaves alternately together in pairs; means connected with the coupling-means for said leaves whereby same are locked in position at certain periods; a second set of traps below said first set of traps comprising a plurality of leaves swung in said receptacle and having an angle of opening different to the angle of opening of the leaves in said first set of traps and controlling passage of material therethrough; means for coupling said leaves alternately together in pairs; means connected with the coupling-means for said leaves whereby same are locked in position at certain periods; means whereby when said first set of traps are unlocked, the locking-means for said second set of traps are operated to lock same, and when said first set of traps return to normal position, the locking-means for said second set of traps are operated to unlock same; means controlled by said second set of traps whereby when same open, water is introduced into the receptacle, and when said second set of traps close, the supply of water is cut off; counterbalancing means whereby the leaves of said sets of traps are returned to normal position after dumping, and means held in said receptacle between said sets of traps whereby the material is mixed.

16. An apparatus of the class described, comprising in combination a suitable receptacle; a trap comprising a plurality of leaves swung therein and controlling passage of material therethrough; mechanism connecting said leaves adapted to control same in operative relation; a locking-arm connected to said receptacle; a stop adapted to co-act with said locking-arm, whereby to hold said trap closed; a weighted arm connected to said receptacle; means to operate said weighted arm.

17. An apparatus of the class described comprising in combination a suitable receptacle; a trap comprising a plurality of leaves swung therein and controlling passage of material therethrough; arms connected to said leaves; a link adapted to connect a pair of said leaves together; a locking-arm pivotally connected to said receptacle; a stop engaging said link and said locking arm to hold said trap closed; means adapted to positively operate said locking means; and means adapted to unlock same; said latter means comprising a pivoted weighted arm and means adapted to cause same to disengage said locking arm and said stop.

18. An apparatus of the class described, comprising a suitable receptacle; a first trap therein controlling passage of material therethrough; a second trap therein also controlling passage of material through said receptacle and below said first trap and having an angle of opening different to the angle of opening of said first trap; means connecting said traps whereby when said first trap opens, said second trap is locked in its closed position, and when said first trap returns to normal position, said second trap is unlocked; means controlled by said second trap whereby when same opens, water is introduced into the receptacle, and when said second trap closes, the supply of water is cut off; a third trap therein also controlling passage of material through said receptacle and below said second trap and having an angle of opening different to the angle of opening of said second trap, and means connecting said second and third traps whereby when said second trap opens, said third trap is locked in its closed position, and when said second trap returns to normal position, said third trap is unlocked.

19. An apparatus of the class described, comprising a suitable receptacle; a first set of traps comprising a plurality of leaves swung therein and controlling passage of material therethrough; means for coupling said leaves alternately together in pairs; means connected with the coupling-means for said leaves whereby same are locked in position at certain periods; a second set of traps below said first set of traps comprising a plurality of leaves swung in said receptacle and having an angle of opening different to the angle of opening of the leaves in said first set of traps and controlling passage of material therethrough; means for coupling said leaves alternately together in pairs; means connected with the coupling-means for said leaves whereby same are locked in position at certain periods; means whereby when said first set of traps are unlocked, the locking-means for said second set of traps are operated to lock same, and when said first set of traps return to normal position, the locking-means for said second set of traps are operated to unlock same; a third set of traps below said second set of traps comprising a plurality of leaves swung in said receptacle and having an angle of opening different to the angle of opening of the leaves in said second set of traps and controlling passage of material therethrough; means for coupling said leaves alternately together in pairs; means connected with the coupling-means for said leaves whereby same are locked in position at certain periods, and means whereby when said second set of traps are unlocked, the locking-means for said third set of traps are operated to lock same, and when said second set of traps return to normal position the locking-means for said third set of traps is operated to unlock same.

20. The combination in an apparatus of the class described of a receptacle; a trap located therein, comprising a plurality of leaves swung therein; coupling means connecting alternate leaves of said trap in pairs; and means coupling a plurality of pairs of coupled leaves in said traps.

21. The combination with a receptacle and a set of counterbalanced traps comprising a plurality of leaves swung therein and controlling passage of material therethrough, of levers secured to said traps and on the outside of said receptacle; link-rods connecting said levers together in pairs so as to alternately couple said leaves; levers secured to the outer leaves; a link-rod connecting said levers together and provided with a stop; a weighted-arm pivoted to the side of said receptacle; a locking-arm pivoted to said weighted-arm, and a spring secured to said weighted-arm and giving positive movement to said locking-arm which is designed to abut against said stop so as to lock said leaves in the closed position and by the movement of said weighted-arm being moved out of engagement with said stop so as to permit said leaves to open.

22. The combination with a receptacle and a set of counterbalanced traps comprising a plurality of leaves swung therein and controlling passage of material therethrough, of levers secured to said traps and on the outside of said receptacle; link-rods connecting said levers together in pairs so as to alternately couple said leaves; levers secured to the outer leaves; a link-rod connecting said levers together and provided with a stop; a weighted-arm pivoted to the side of said receptacle; a locking-arm pivoted to said weighted-arm; a spring secured to said weighted-arm and giving positive movement to said locking-arm which is designed to abut against said stop so as to lock said leaves in the closed position and by the movement of said weighted-arm being moved out of engagement with said stop so as to permit said leaves to open, and guard-plates secured on the inside of said receptacle above the sides of said leaves.

23. The combination with a receptacle and a set of counterbalanced traps comprising a plurality of leaves swung therein and controlling passage of material therethrough, of levers secured to said traps and on the outside of said receptacle; link-rods connecting said levers together in pairs so as to alternately couple said leaves; levers secured to the outer leaves; a link-rod connecting said levers together and provided with a stop; a weighted-arm pivoted to the side of said receptacle; a locking-arm pivoted to said weighted-arm; a spring secured to said weighted-arm and giving positive movement to said locking-arm which is designed to abut against said stop so as to lock said leaves in the closed position and by the movement of said weighted-arm being moved out of engagement with said stop so as to permit said leaves to open; guard-plates secured on the inside of said receptacle above the sides of said leaves; flexible aprons secured to said guard-plates and resting upon said leaves, and flexible aprons secured to said receptacle and on the inside thereof and overhanging the ends of the leaves adjacent the sides of said receptacle.

24. An apparatus for mixing composite materials comprising in combination a stationary supporting structure; a top trap and a plurality of lower traps substantially vertically situated, secured against bodily movement, operable therein; a stationary receptacle above and connected to each trap, means to start the top trap in operation; trap locking and unlocking mechanism connecting said traps one with another whereby the weight of material passing through the apparatus causes said lower traps to operate successively to retain and dump material.

25. An apparatus of the class described comprising in combination a stationary receptacle and a trap comprising an outer pair $a$ and $d$ and an inner pair $b$ and $c$ of downward swinging pivoted leaves, the inner pair of leaves $b$ and $c$ being adapted when open to extend downwardly and outwardly and the outer pair of leaves $a$ and $d$ to extend downwardly and inwardly.

26. An apparatus of the class described, comprising a receptacle provided with a plurality of sets of traps comprising a plurality of leaves swung therein which control passage of material therethrough; the angle of opening of the leaves in each alternate set of traps being different to the angle of opening of the leaves in the intermediate set of traps; means controlling the movement of the leaves of the different sets of traps so as to provide alternate sets of hoppers having constricted discharge-openings, and obstructions or mixing-means placed in said receptacle intermediate the different sets of traps.

27. An apparatus of the class described comprising a plurality of superimposed downwardly opening traps, held a fixed distance apart, a stationary receptacle above and connected to each trap; independent means for closing each trap; means dependent on an upper trap for securing a lower trap in a closed position, and permitting the opening of a lower trap.

28. An apparatus of the class described, comprising a plurality of superimposed downwardly opening traps, held a fixed distance apart; a stationary receptacle above and connected to each trap; consecutive traps opening crosswise to one another, and means for controlling the operation of said traps.

29. An apparatus of the class described, comprising a plurality of superimposed downwardly opening traps, held a fixed distance apart; a stationary receptacle above and connected to each trap, said traps comprising a plurality of pivoted downwardly opening leaves, the leaves of a trap opening crosswise to the leaves of a consecutive trap; and means controlling the operation of said traps.

30. An apparatus of the class described, comprising a plurality of substantially vertically superimposed traps; a rigid non-moving receptacle above and connected to each trap, each trap being normally closed; means automatically locking a lower trap closed when a trap immediately above is open, and means for closing an upper trap and thereby releasing a lower trap so that same may open.

31. An apparatus of the class described, comprising a plurality of substantially vertically superimposed traps; a rigid non-moving receptacle above and connected to each trap; means for securing a lower trap closed operated by the opening of a trap immediately above, and means for closing an upper trap independent of a lower trap.

32. An apparatus of the class described, comprising a plurality of substantially vertically superimposed down-opening traps having pivoted leaves; a stationary receptacle above and connected to each trap, adapted to receive and hold material when piled high therein, means mechanically controlling the operation of said traps, and means for dampening material in a receptacle.

33. An apparatus of the class described, comprising a plurality of substantially vertically superimposed traps, each trap having in combination a plurality of leaves, links and arms connecting said leaves to operate same in unison; a rigid receptacle connected to each trap; a link connecting the leaves of an upper trap to a weighted arm pivoted to a receptacle; a pivoted arm operated by said weighted arm to engage and disengage a stop on a link connected to the leaves of a lower trap.

34. An apparatus of the class described, comprising a rigid receptacle through which material passes by gravity; a trap connected to said receptacle; means locking and unlocking said trap to prevent and permit movement of same, said means comprising a stop combined with mechanism connected to said trap; a weighted arm pivoted to said receptacle; an arm engaging said stop, and means for striking said stop-engaging arm with said weighted arm.

35. An apparatus of the class described, comprising a plurality of substantially vertically superimposed non-moving chambers into which material falls by gravity and are mixed therein; traps to arrest the passage of material between said chambers, each trap having a plurality of laterally situated substantially parallel discharge openings constructed crosswise to that of a consecutive trap and means controlling the operation of said traps.

36. An apparatus of the class described, comprising in combination a stationary receptacle; a trap and mixing means; said trap comprising a plurality of pivoted down and oppositely opening leaves adapted to form a discharge spout when open; means connecting said leaves adapted to positively cause said leaves to open and close in unison and whereby said leaves become inoperative if one of said leaves should become blocked; means adapted to lock said trap closed; means adapted to unlock and permit said traps to open; gravity-operated means adapted to close said leaves automatically and positively in unison, and means connected with said trap adapted to operate a fluid controlling means discharging below said leaves on the opening of said trap.

37. An apparatus of the class described, comprising in combination a stationary receptacle, a trap and mixing means; said trap comprising a plurality of pivoted down and oppositely opening leaves adapted to form a discharge spout when open; means connecting said leaves adapted to positively cause said leaves to open and close in unison and whereby said leaves become inoperative if one of said leaves should become blocked; means adapted to lock said trap closed; means adapted to unlock and permit said traps to open; gravity-operated means adapted to close said leaves automatically and positively in unison; an arm adapted to undergo an oscillating movement on the operation of said leaves; a link adapted to be reciprocated by said arm; a lever operated by said link adapted to open and close a fluid-valve on the opening and closing of said trap leaves respectively.

In testimony whereof I have signed my name to this specification in the presence of two subscribing witnesses.

JOHN FREDERICK DOUGLAS WITHROW.

Witnesses:
EDMUND F. BURRITT,
ILMA MEWBY.